United States Patent
Ahsan et al.

(10) Patent No.: US 9,554,110 B1
(45) Date of Patent: Jan. 24, 2017

(54) METHODS AND CONTROLLERS FOR CONTROLLING A DATA STORAGE DEVICE AND DATA STORAGE DEVICE COMPRISING THE SAME

(71) Applicant: Western Digital Technologies, Inc., Irvine, CA (US)

(72) Inventors: Abou Ul Aala Ahsan, Irvine, CA (US); Alan T. Meyer, Anaheim Hills, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 290 days.

(21) Appl. No.: 13/838,535

(22) Filed: Mar. 15, 2013

(51) Int. Cl.
*H04N 9/79* (2006.01)

(52) U.S. Cl.
CPC ...................................... *H04N 9/79* (2013.01)

(58) Field of Classification Search
CPC ....... H04N 5/85; H04N 9/8042; H04N 9/7921
USPC ....... 386/328, 201, 215, 219, 233, 244, 253, 386/261, 295
See application file for complete search history.

(56) References Cited

U.S. PATENT DOCUMENTS

| | | | |
|---|---|---|---|
| 6,304,714 B1 | 10/2001 | Krause et al. | |
| 7,251,480 B1 * | 7/2007 | Oh et al. | 455/413 |
| 7,529,465 B2 | 5/2009 | Barton et al. | |
| 7,702,925 B2 | 4/2010 | Northcutt et al. | |
| 7,835,617 B2 | 11/2010 | Fujita et al. | |
| 7,903,930 B2 | 3/2011 | Fujita et al. | |
| 7,945,140 B2 | 5/2011 | Aubry et al. | |
| 8,139,924 B2 * | 3/2012 | Walters et al. | 386/328 |
| 8,254,171 B2 | 8/2012 | Kaneda | |
| 2005/0097341 A1 * | 5/2005 | Francis | G06F 21/10 713/189 |
| 2006/0047975 A1 * | 3/2006 | Beukema | H04L 9/00 713/193 |
| 2006/0259652 A1 * | 11/2006 | Poo | 710/8 |
| 2008/0065905 A1 * | 3/2008 | Salessi | 713/193 |
| 2008/0084782 A1 * | 4/2008 | Fukada | 365/239 |
| 2010/0332569 A1 * | 12/2010 | Bryant-Rich et al. | 707/912 |
| 2012/0038647 A1 | 2/2012 | Maruyama et al. | |

FOREIGN PATENT DOCUMENTS

WO WO03048904 6/2003

* cited by examiner

*Primary Examiner* — Thai Tran
*Assistant Examiner* — Nien-Ru Yang
(74) *Attorney, Agent, or Firm* — Young Law Firm, P.C.

(57) ABSTRACT

A method of controlling a data storage device comprising a storage medium using a storage device controller. The method may comprise receiving and providing data to be written to and read from the storage medium over a first interface of the data storage device; receiving and providing data to be written to and read from the storage medium over a second interface of the data storage device; and selectively processing at least data received and provided over the second interface through at least one of an audio codec and a video codec provided within the data storage device controller. The first interface may comprise, for example, a SAS/SATA interface and the second interface may comprise, for example, an HDMI or other high data rate interface.

27 Claims, 8 Drawing Sheets

FIG. 1

(Prior Art)

VIDEO

FIG. 9

AUDIO

```
┌─────────────────────────────────────────┐
│ RECEIVE AND PROVIDE DATA TO BE WRITTEN TO │ B121
│ AND READ FROM STORAGE MEDIUM OVER A       │
│ FIRST INTERFACE OF DATA STORAGE DEVICE    │
└─────────────────────────────────────────┘

┌─────────────────────────────────────────┐
│ RECEIVE AND PROVIDE DATA TO BE WRITTEN TO │ B122
│ AND READ FROM STORAGE MEDIUM OVER A       │
│ SECOND INTERFACE OF DATA STORAGE DEVICE   │
└─────────────────────────────────────────┘

┌─────────────────────────────────────────┐
│ SELECTIVELY PROCESS AT LEAST DATA RECEIVED│ B123
│ AND PROVIDED OVER SECOND INTERFACE        │
│ THROUGH AUDIO AND/OR VIDEO CODECS         │
│ PROVIDED WITHIN STTORAGE DEVICE           │
│ CONTROLLER                                │
└─────────────────────────────────────────┘
```

*FIG. 12*

METHODS AND CONTROLLERS FOR CONTROLLING A DATA STORAGE DEVICE AND DATA STORAGE DEVICE COMPRISING THE SAME

BACKGROUND

Large capacity storage devices are currently deployed for use with both computing devices and audio/visual (AV) applications and devices. Devices such as Digital Video Recorders (DVRs) and Personal Video Recorders (PVRs) are examples of such AV applications. Conventionally, however, data storage devices store data in the same manner, irrespective of the type of data.

DETAILED DESCRIPTION

Figure 1:
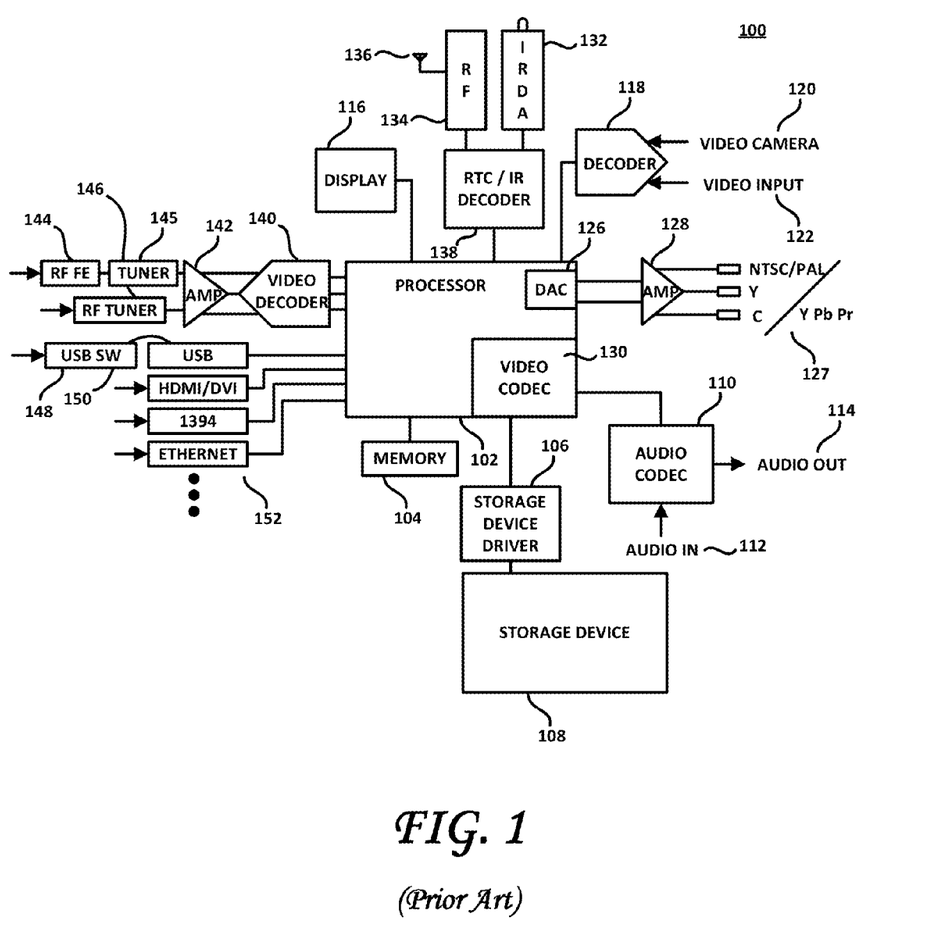
FIG. 1 is a block diagram of a conventional digital video system.

As the demarcation between computing and entertainment devices is further blurred by versatile devices equally adept in both roles, there has developed a need to process and store both application files and AV content in a more efficient manner. FIG. 1 is a block diagram of a conventional AV system 100. The AV system 100 may form part of a conventional DVR or any other AV-processing system comprising data storage. As shown therein, the AV system 100 comprises a processor 102 to which a storage device 108 is coupled. A storage device driver 106, coupled between the processor 102 and the data storage device 108, comprises the necessary structure and functionality to operate or control the data storage device 108. The processor 102 is also coupled to one or more memories, such as shown at 104. The memory 104 may comprise non-volatile memory for storage of firmware, for example, and volatile memory for temporary storage of data. A cable television signal may be input to an RF front end 144 and fed to a tuner 145. Alternatively, a satellite-originated AV signal may be input to a tuner 146. Such signals may then be amplified in Amp 142, after which the amplified AV signal may be decoded in video decoder 140 and thereafter input to processor 102, for processing and/or display on display 116. Other AV signals may also be input to the processor 102 via a variety of interfaces, such as Universal Serial Bus (USB) interface 150, optionally via a USB switch 148 or, as shown at 152, an High-Definition Multimedia Interface (HDMI) or Digital Video Interface (DVI), a Firewire (IEEE 1394) interface, an Ethernet interface, among many possibilities. Control signals may be received via a radio frequency (RF) interface 134 and antenna 136 and/or via an Infrared Data Association (IrDA)-compatible interface, as shown at 132. Received control signals may be input to an RF/IR decoder 138 and the decoded control signals may be provided to the processor 102. Other sources of AV signals may be provided, such as a video camera 120 or other video input, as shown at 122. Such input AV signals may be appropriately decoded in a decoder 118 and the decoded AV signal provided to the processor 102. Decoded digital video streams may be displayed on a display device 116. Processed digital signals may also be output to analog devices, such as analog televisions and analog displays. To do so, the digital AV signal may be decompressed and sent through a Digital-To-Analog Converter (DAC) 126, amplified in an amplifier 128 and output as, for example, a National Television System Committee (NTSC) signal, a Phase Alternating Line (PAL) television signal or as composite video signals, as shown at 127.

As shown at 130, the processor 102 may comprise or be otherwise programmed to emulate a video codec. A video codec is a device or software that enables encoding, decoding, compression or decompression of digital video. Similarly, the processor 102 may be coupled to an audio codec (i.e., a device or computer program capable of encoding or decoding a digital audio data stream or signal) 110 may be coupled to the processor 102. The audio codec 110 may comprise an input configured to accept an audio signal, as shown at 112 and an output configured to output an audio signal, as shown at 114. An Analog-to-Digital (ADC) may be provided to convert analog audio input to digital form and a DAC may be provided to convert a decoded audio stream to analog form, so as to enable the analog audio signal to be amplified and provided to speakers to generate an audible sound.

Overview

According to one embodiment, a storage device may be provided with the ability to characterize data to be stored onto or read from the data storage device and to selectively encode, encrypt and/or compress and to selectively decode, decrypt and/or decompress the data based upon the characterization. For example, according to one embodiment, the data may be characterized by the data storage device as comprising AV data and, based on such characterization, the data storage device may encode, encrypt and/or compress the data (on a write) and may decode, decrypt and/or decompress the data (on a read) in order to improve the capacity and functionality of the data storage device without adding additional cost to the host system. Indeed, according to one embodiment, as AV data is written to the data storage device, the data storage device may compresses the data and reduce the amount of storage required. Encoding and encrypting may also be carried out contemporaneously. Conversely, according to one embodiment, as AV data is read from the data storage device, the data storage device may decompress the data and restores the AV data to its original format. Decoding and decrypting may also be carried out contemporaneously. In so doing, by treating different kinds of data differently while performing read and write operations on the data storage device, the storage capacity thereof may be significantly increased by applying audio and/or video compression on data characterized as being audio and/or video data before storing it to a physical medium in the data storage device. According to one embodiment, the data storage device may comprise a first and one or more second interfaces. Indeed, according to one embodiment, the data storage device may include one or more first interfaces and one or more second interfaces. Any of the compress, decompress, encode, decode, encrypt and decrypt operations may be carried out on data received at or presented to the first or second interfaces. According to one embodiment, non-audio and/or non-video data may be selectively received at and provided from at least a first interface of a data storage device and audio and/or video data may be selectively received at and provided from at least a second interface of the data storage device. The first interface may comprise, for example, a SAS/SATA interface and the second interface(s) may comprise, for example, an HDMI, DVI or other high data rate interface. According to one embodiment, the data storage device may comprise two or more first interfaces and/or two or more second interfaces of the same or different type.

Figure 2:
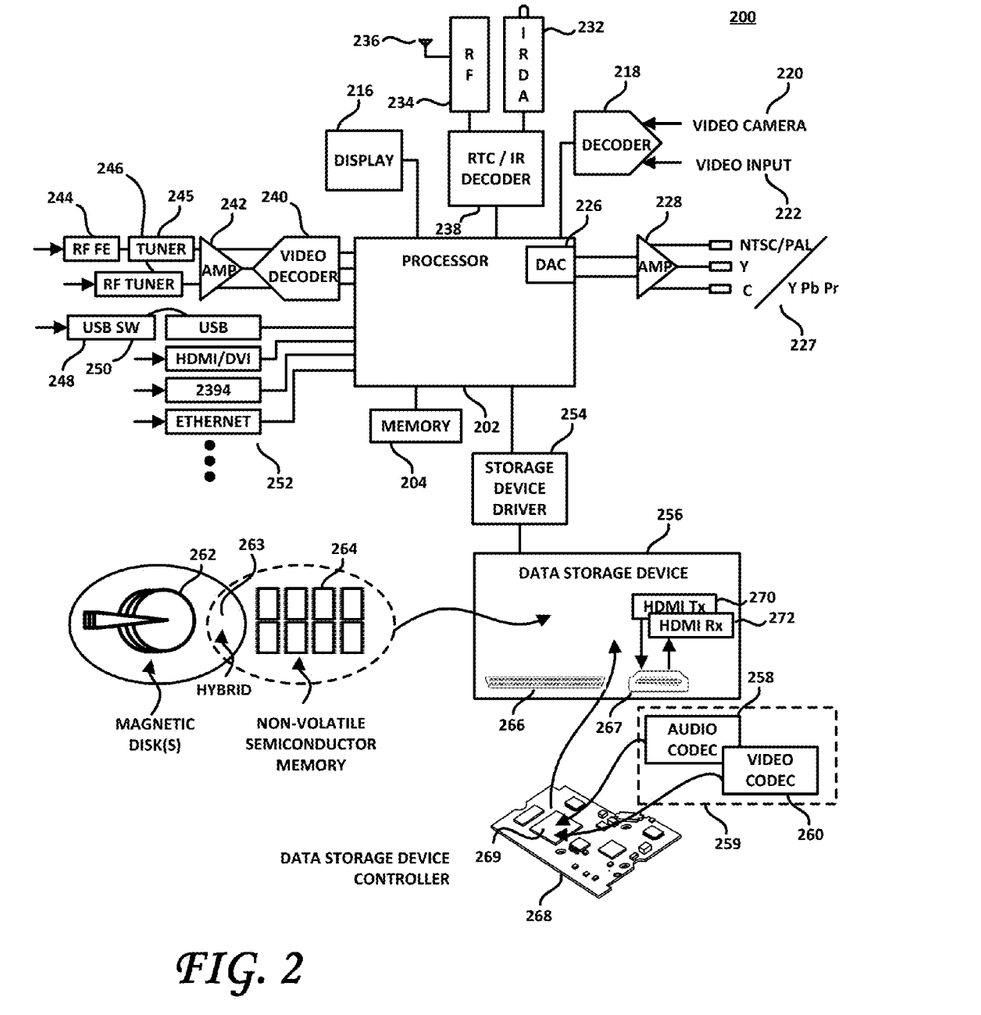
FIG. 2 is a block diagram of a digital video system according to one embodiment.

FIG. 2 is a block diagram of a video system according to one embodiment. As shown therein, the AV system 200 according to one embodiment may form part of a DVR or any other AV-processing system comprising data storage. As shown therein, the AV system 200 may comprise a processor 202 to which a data storage device 256 according to one embodiment may be coupled. The coupling may be a wired, direct connection or may be a wired or wireless coupling over a network such as a Local Area Network (LAN). For example, the data storage device 256 may comprise a Network Attached Storage (NAS). A storage device driver 254 may be coupled to the data storage device 256 and may comprise the necessary functionality to enable the host to issue commands to the data storage device and to at least write data to and read data from the data storage device 256. The processor 202 may also be coupled to one or more memories, such as shown at 204. The memory 204 may comprise non-volatile memory for storage of firmware, for example, and volatile memory for temporary storage of data. A cable television signal may be input to an RF front end 244 and fed to a tuner 245. Alternatively, a satellite-originated AV signal may be input to a tuner 246. Such signals may then be amplified in Amp 242, after which the amplified AV signal may be decoded in video decoder 240 and thereafter input to processor 202, for processing and/or display on display 216. Other AV signals may also be input to the processor 202 via a variety of interfaces, such as a USB interface 250, optionally via a USB switch 248 or, as shown at 252, an HDMI or DVI interface, an IEEE 1394 interface, an Ethernet interface, among many possibilities. Control signals may be received via a radio frequency (RF) interface 234 and antenna 236 and/or via an IrDA-compatible interface, as shown at 232. Received control signals may be input to an RF/IR decoder 238 and the decoded control signals may be provided to the processor 202. Other sources of AV signals may be provided, such as a video camera 220 or other video input, as shown at 222. Such input AV signals may be appropriately decoded in a decoder 218 and the decoded AV signal provided to the processor 202. Digital video streams may be displayed on a display device 216. Processed digital signals may also be output to analog devices, such as analog televisions and analog displays. To do so, the digital AV signal may be decompressed and sent through a DAC 226, amplified in an amplifier 228 and output as, for example, NTSC or PAL television signals or as composite video signals, as shown at 227.

According to one embodiment and as shown in FIG. 2, the data storage device 256 itself may comprise an audio codec 258 and/or a video codec 260. Such audio and/or video codecs may be integrated in a System-on-Chip (SoC), together with or coupled to the data storage device controller 269. Indeed, as shown, the data storage device 256 may comprise or be otherwise programmed to emulate a video codec 260, to enable the data storage device to selectively and efficiently encode, decode, encrypt, decrypt, compress, decompress, transcode, pass through and store digital video. According to one embodiment, the video codec 260 may be integrated into data storage device controller 269. According to one embodiment, data storage device 256 may also comprise or be otherwise programmed to emulate an audio codec 258, to enable the data storage device to selectively and efficiently encode, decode, encrypt, decrypt, compress, decompress, transcode, pass through and store digital audio data. According to one embodiment, the audio codec 258 may be integrated into data storage device controller 269. According to embodiments, the data storage device 256 may comprise one or more rotating magnetic disks 262, one or more non-volatile semiconductor memory devices 264 or may be a hybrid storage device 263 comprising both rotating magnetic disks 262 and non-volatile semiconductor memory 264 for data storage.

As shown at 266 and according to one embodiment, the data storage device may comprise at least a first interface 266 and a second interface 267. According to one embodiment, the first interface 266 may comprises a native interface such as, for example, Small Computer System Interface (SCSI), Serial Advanced Technology Attachment (SATA), USB, Peripheral Component Interconnect (PCI), PCI express (PCIe), SCSI over PCIe (SOP), Fibre Channel (FC), Ethernet, Thunderbolt, Universal Asynchronous Receive transmit (UART) or Serial Attached SCSI (SAS). Other interfaces may be implemented. According to one embodiment, the second interface may be configured as a digital interface or an analog interface. Both may be provided. The digital interface(s) may comprise, for example, an HDMI, DVI, IEEE 1394 or Thunderbolt, Low Voltage Differential Signaling (LDVS) interface. The second interface 267 may also be configured according to other high data rate interface protocols. The analog interface may comprise, for example, an SVGA, Component, Composite or S-Video interface. For ease of illustration and explanation, the second interface 267 may be referred to hereafter as an HDMI interface. However, it is to be understood that the second interface(s) 267 may be configured according to any other high-bandwidth interface suited to AV data. It is to be noted that any of interface protocols listed for the second interface(s) may be used for the first interface(s) and any of the interface protocols listed for the first interface(s) may be used for the second interface(s).

According to one embodiment, storing and retrieving data on the data storage device 256 over an HDMI interface 267, increases data throughput and simplifies the overall design of video systems. Indeed, a data storage device according to one embodiment, comprising a video codec 260 and/or an audio codec 258 and a high data rate interface such as an HDMI interface 267 may find broad applicability in consumer devices such as televisions, DVRs, tablets and other mobile computing platforms, Digital Versatile Disk (DVD) players, cameras, security systems and personal computers (PCs), to identify but a few examples. Moreover, a data storage device according to one embodiment, comprising an audio codec 258 and/or a video codec 260 and a high data rate interface such as an HDMI interface may also find broad applicability in enterprise devices such as Web servers, RAID installations, server farms, cloud storage and the like.

As shown in FIG. 2, the video codec 260 and/or the audio codec 258 may be provided on a printed circuit board assembly (PCBA) of the data storage device. Alternatively, the audio and video codecs 258, 260 may be provided as discrete assemblies and/or firmware code within the data storage device 256 and coupled to the data storage device controller. Alternatively still and according to one embodiment, the video codec 260 and/or the audio codec 258 may be provided as discrete Integrated Circuits (ICs) on the PCBA 268. According to one embodiment, the audio and video codecs 258, 260 may be integrated into a SoC, which may integrate some, many or all components of a data storage device controller 269 of the data storage device 256 on a single integrated circuit. According to one embodiment, the SoC may be coupled to the PCBA 268. Providing the audio and video codecs 258, 260 and support for the HDMI interface 267 within a SoC, according to one embodiment, requires support for and integration of components such as HDMI Receiver (HDMI Rx) and HDMI Transmitter (HDMI Tx) in the data storage device SoC. This enables raw video data to be sent to the data storage device 256 using HDMI Rx, which data may be stored therein (i.e., on one or more disks and/or on non-volatile memory devices) selectively with or without compression, encoding or encryption using, for example, a SAS or SATA interface. Similarly, when video and/or audio data is to be retrieved from the data storage device 256, the data to be retrieved may be first sent over the SAS interface, whereupon the video and/or audio data may be sent to the HDMI Tx selectively with or without applying corresponding de-compression, decoding and/or decryption. The data may be suitably encrypted before being provided to the HDMI Tx, for copyright and digital rights management (DRM) purposes, for example.

According to embodiments, using a video codec 260 and/or an audio codec 258 or using an integrated audio-video processing codec, as suggested at 259 in FIG. 2 on a data storage device SoC, data may be compressed before storing onto the physical medium (e.g., disk, non-volatile memory or both) and the data may be decompressed while retrieving data from the physical storage medium. By performing such compression, the storage capacity of the data storage device 256 may be significantly enhanced, particularly for multimedia applications. For example, according to one embodiment, the capacity of the data storage device may be increased by greater than an order of magnitude, depending on the degree of compression.

Modes of Operation

According to one embodiment, the controller 269 of the data storage device 256, and hence the data storage device 256 itself, may be configured in at least the following modes.

Closed LOOP Mode

In the closed loop mode, the audio and video codecs 258, 260 of the controller 269 may be configured for encoding, encrypting and/or compressing the audio and/or video data received at the second interface 267. Similarly, the audio and video codecs 258, 260 of controller 269 may be further configured for decoding, decrypting and/or decompressing audio and/or video data stored in the data storage device 256, which decoded, decrypted and/or decompressed data may thereafter be provided on demand to the second interface 267 (and/or to the first interface 266). As the data storage device 256, according to one embodiment, handles all encoding/decoding, encrypting/decrypting and compressing/decompressing duties internally, the data storage device 256 need not support all different AV formats available.

Transcode/Player Mode

According to one embodiment, the data storage device may comprise a decoder to support different AV formats including, for example, legacy video formats such as H261/3, MPEG2/4, AVC, VC1, Real, FLASH and the like. In this manner, data stored on the data storage device 256 in any supported format may be decoded before transmitting to, for example, a host device (such as 202 in FIG. 2) coupled the data storage device 256. The data storage device 256 may comprise firmware that may be updated to support evolving or new audio and/or video standards and protocols.

Lossless Mode

In cases wherein preservation of the original audio and/or video data is necessary or desired, lossless compression may be applied to data to be stored within the data storage device 256. In this manner, the lossless compression applied to quality-sensitive AV data may be employed to achieve higher data storage capacity while preserving the integrity of the data being stored.

Pass Through Mode

In the pass through mode, the incoming data stream may be preserved during read/write operations. In this case, no encoding, encryption and/or compression may be applied to the AV or other data. In the pass through mode, the data storage device 256 may be used as a normal, legacy storage device and may support all of the functionality and performance of data storage devices that lack the structures and functionalities described and shown herein.

Data Storage Device Operation

According to one embodiment, acquisition of AV data may be from HDMI Rx 272, and the video output may be available from HDMI Tx 270. Data may be written, read in compressed or uncompressed formats or in a pass through mode.

Compress Mode Read/Write

According to one embodiment, in the compress mode, after acquisition of the AV data from HDMI Rx 272, data may be saved on the storage medium of the data storage device 256 using a video compress engine such as Advanced Video Coding (AVC), formally ISO/IEC 14496-10 MPEG-4 part10 AVC, or one of its successor protocols such as High Efficiency Video Coding (HEVC). Other compression engines, methods and protocols may also be used. According to one embodiment, a single compression engine may be utilized. Additional compression engines may be added to support other compression protocols. According to one embodiment, one of a plurality of available compression protocols may be dynamically selected and applied contemporaneously with the start of the write process.

Write Operation

Figure 3:
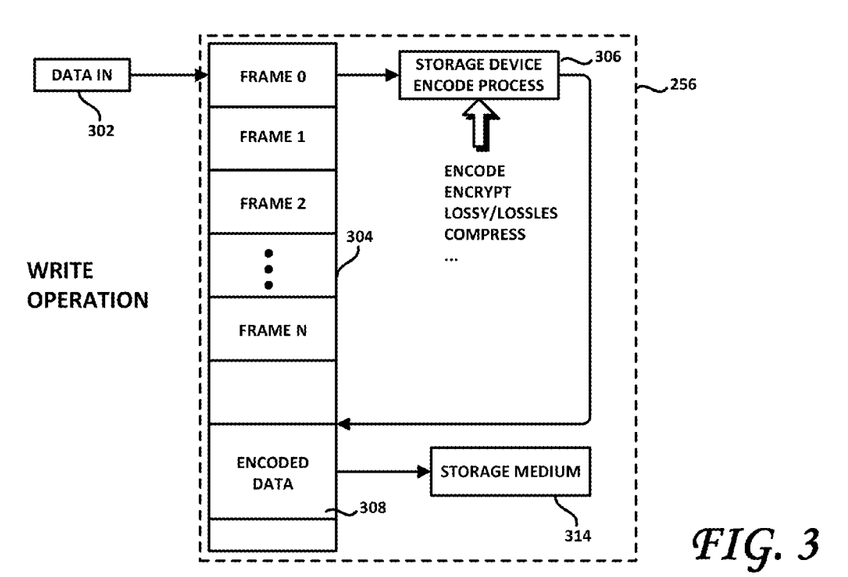
FIG. 3 is a block diagram illustrating a write operation of audio and/or video data to a storage device, according to one embodiment.

FIG. 3 is a diagram illustrating a write operation of audio and/or video data to a storage device, according to one embodiment. As shown therein, data 302 to be written may be provided to the data storage device 256, via the HDMI interface 267, for example. The data storage device 256, according to one embodiment, may be configured to characterize the data 302. Depending upon the result of such characterization, the data 302 may be differently processed. Indeed, according to one embodiment, if the data storage device characterizes the data 302 as not comprising audio and/or video data, the data storage device may not pre-process the data prior to storage. That is, the data storage device 256 may operate in pass through mode, in which no compression, encryption or other encoding is carried out on the data prior to being written to the storage medium or media of the data storage device 256. According to one embodiment, however, if the result of the characterization is that the data 302 comprises AV data, the data storage device 256 may be configured to operate in closed loop or transcode mode in which the incoming data 302 may be temporarily stored in a frame buffer 304 in a volatile memory of the data storage device 256 and processed before storage on the storage medium or media 314. Such processing may be carried out by an encode process 306, in which the buffered data may be encoded, encrypted and/or compressed in a lossy or lossless manner. Assuming that the incoming data 302 is characterized as comprising AV data, the encode process 306 (carried out in software, firmware, programmable firmware and/or hardware) may process data in frame buffer 304 to generate encoded data 308, which data may have been encoded, encrypted and/or compressed and temporarily stored in the frame buffer 304. The buffered encoded data 308 may then be stored on the storage medium 314. It is to be noted that, within the present context and according to one embodiment, most any differentiator may be used to discriminate AV data from non-AV data in the incoming data 302. For example, the data storage device may characterize the incoming data 302 as comprising static image data or as not comprising static image data and process the incoming data stream 302 differently depending on the result of such characterization. Alternatively, according to one embodiment, data provided to the second interface 267 may be a priori characterized and processed as containing AV data. Other criteria may be used.

According to one embodiment, after the data storage device 256 acquires the AV data 302, the AV data may be saved on the storage medium 314 using an encode process 306. According to one embodiment, a single encode engine in the SoC may be used. However, according to one embodiment, the SoC may be configured with additional encode engines, to support other encrypting, encoding and/or compression standards or protocols. The present storage device 256 may be configured to select a suitable protocol in a dynamic manner chosen before starting the write process.

Read Operation

Figure 4:
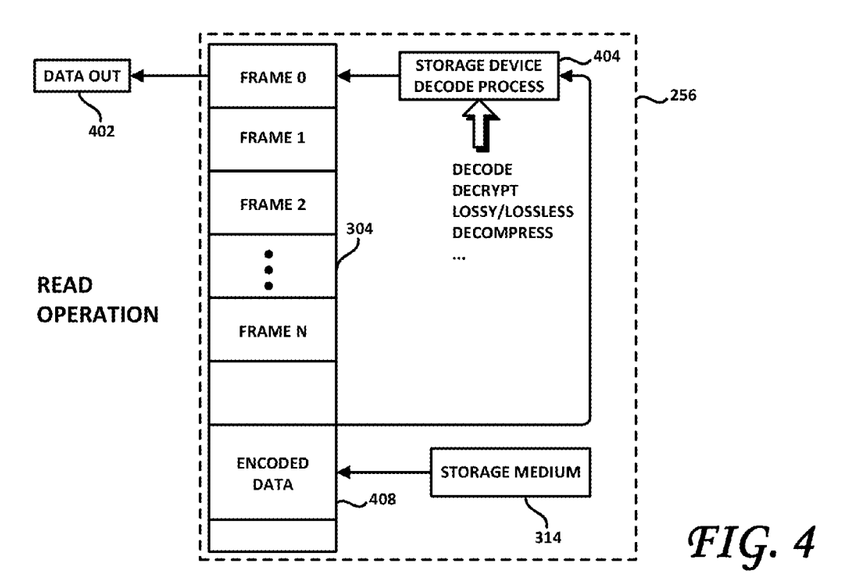
FIG. 4 is a block diagram of a read operation of audio and/or video data to a storage device, according to one embodiment.

FIG. 4 is a block diagram of a read operation of audio and/or video data to a storage device, according to one embodiment. As shown therein, upon receipt of a read command from a host, the data storage device may read the storage medium 314 and retrieve therefrom the previously stored and encoded data, which may then be temporarily stored in frame buffer 304, a shown at 408. A decode process 404 may then retrieve the encoded data 408 from the frame buffer 304, suitably decode the retrieved encoded data and provide the decoded data to frame buffer 304, whereupon the decoded buffered data may be provided as Data Out at 402. Data Out 402 of FIG. 4 may be provided via the same or a different interface 266, 267 as was Data In 302 in FIG. 3.

Write Operation for Non-Copy Protected, Pass through and Copy Protected Data

Figure 5:
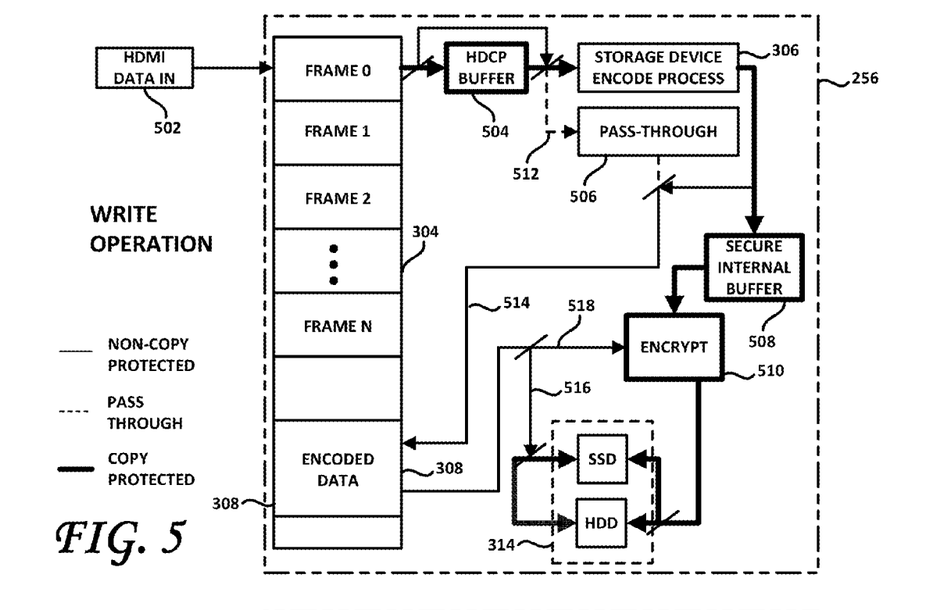
FIG. 5 is a block diagram of a write operation for non-copy protected, pass through and copy protected audio and/or video data to a data storage device, according to one embodiment.

FIG. 5 is a block diagram of a write operation for non-copy protected, pass through and copy protected audio and/or video data to a storage device, according to one embodiment. For pass through data (dashed lines in FIGS. 5 and 6), data for which no encoding is applied prior to storing in the storage medium 314, data 502 may be provided via the first or second interfaces 266, 267. In FIG. 5, the data is shown at 502 as being provided via the HDMI interface, shown at 267 in FIG. 2. The thus-provided data may be temporarily stored in frame buffer 304 and provided to pass through 506 via path 512, via one or more switches. The pass through data may then be stored at 308 in frame buffer 304 before being stored in data storage device 314, which may comprise a solid state memory and/or a disk drive. For non-copy protected data, (thin lines in FIGS. 5 and 6), the data provided over, for example, the second interface 267, shown at 502, may be temporarily stored in frame buffer 304, whereupon the buffered data may be provided to encode process 306, similarly to that shown and described relative to FIG. 3. The encoded data may then be stored in frame buffer as shown at 308, via path 514 and one or more switches. The buffered encoded data 308 may then be stored in storage medium 314, via path 516 and a switch. Alternatively, the buffered encoded data 308 may be encrypted at 510 via path 518 before being stored in storage medium 314 via, for example, a SAS or SATA interface.

In order to safeguard copyrighted, DRM-protected or other sensitive data, according to one embodiment, after acquiring the data from HDMI Rx 272, the acquired copyrighted or otherwise protected data (whose path is shown in FIG. 5 in bold lines) may be buffered and temporarily stored in frame buffer 304 before being stored in a secure High Bandwidth Digital Content Protection (HDCP) buffer (or other secure store) 504. According to one embodiment, the copy-righted or otherwise protected data may be directly stored in the HDCP buffer, to prevent access thereto by non-secure devices and processes. The HDCP-buffered data may then be encoded by storage process 306 and the encoded data may then be provided to a secure internal buffer 508 before being (e.g., HDCP-) encrypted at 510 and stored in storage medium 314 via, for example, a SAS or SATA interface. According to one embodiment, compressed/encoded content may not be placed in a hardware buffer, such as frame buffer 304. Indeed, such frame buffer 304 may be accessible by a non-secure processor or by physical probing of the controller integrated circuit. Instead, such copyrighted data may be stored in an HDCP (or functionally similar) buffer 504 and in a secure internal buffer after the encoding process but before the encoded copyrighted data is encrypted prior to storage on the storage medium 314 via, for example, a SAS or SATA interface.

It is to be noted that, in the pass through and in modes where the data is not being compressed prior to being written to the storage medium 314, it is possible that the interface throughput (the rate at which Data In 502 is fed to the disk drive 256) may be, in fact, faster than the speed at which data may be written to disk. This may be the case, for example, when the second interface 267 through which the Data In 502 arrives is configured as an HDMI interface. To address this discrepancy, the data storage device 256 may be provided with a robust amount of solid state storage, whose write speed is more than adequate to keep up with HDMI data rates. Such solid state storage may be in the form of a buffer for temporary storage or may be the primary storage of the data storage device 256, alone or in combination with rotating media-based data storage. Data received in the solid state storage may then be transferred, if desired, to the rotating media after the data storage device has acknowledged safe receipt thereof to the host.

Read Operation for Non-Copy Protected, Pass Through and Copy Protected Data

Figure 6:
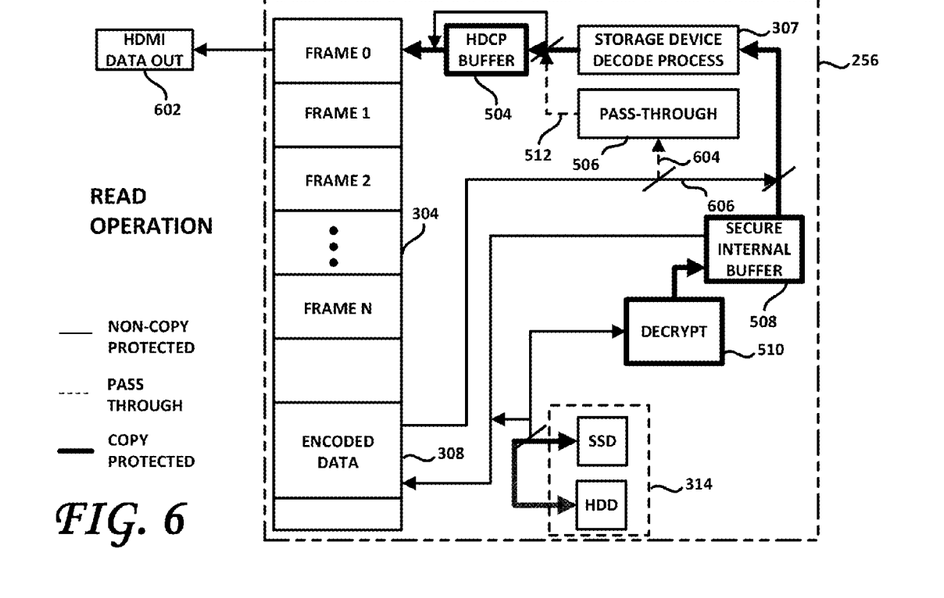
FIG. 6 is a block diagram of a read operation for non-copy protected, pass through and copy protected audio and/or video data to a data storage device, according to one embodiment.

FIG. 6 is a block diagram of a read operation for non-copy protected, pass through and copy protected audio and/or video data to a storage device, according to one embodiment. For pass-through data (e.g., un-encoded data), data stored in the storage medium 314 may be temporarily stored in frame buffer 304 at 308, before being passed to pass-through 506 via path 604 before being stored in frame buffer 304, bypassing the HDCP buffer 504. The buffered output data may then be provided at 602, via interface 267, for example. For non-copyrighted (but otherwise encoded) data, after being read from the storage medium 314 via, for example, a SAS or SATA interface and stored in frame buffer 304, the read data may be provided to decode process 307 through path 606. After being decoded at 306, the data may be stored in frame buffer 304, bypassing HDCP buffer 504, before being provided as Data Out at 602, via an HDMI interface, for example. For copyrighted or otherwise protected data, such data may be read from storage medium 314, (e.g., HDCP-) decrypted at 510 before being temporarily stored in secure internal buffer 508. The decrypted and buffered data may then be provided to decode process 307 and the HDCP (or other functionally similar) buffer 504 before being output as (e.g., HDMI) Data Out 602. A ring buffer (FIG. 10) in volatile memory may be established to provide buffered, DVR-like functionality. For copyrighted data, the ring buffer may be provided in HDCP buffer 504.

Non-Linear Mode

Figure 7:
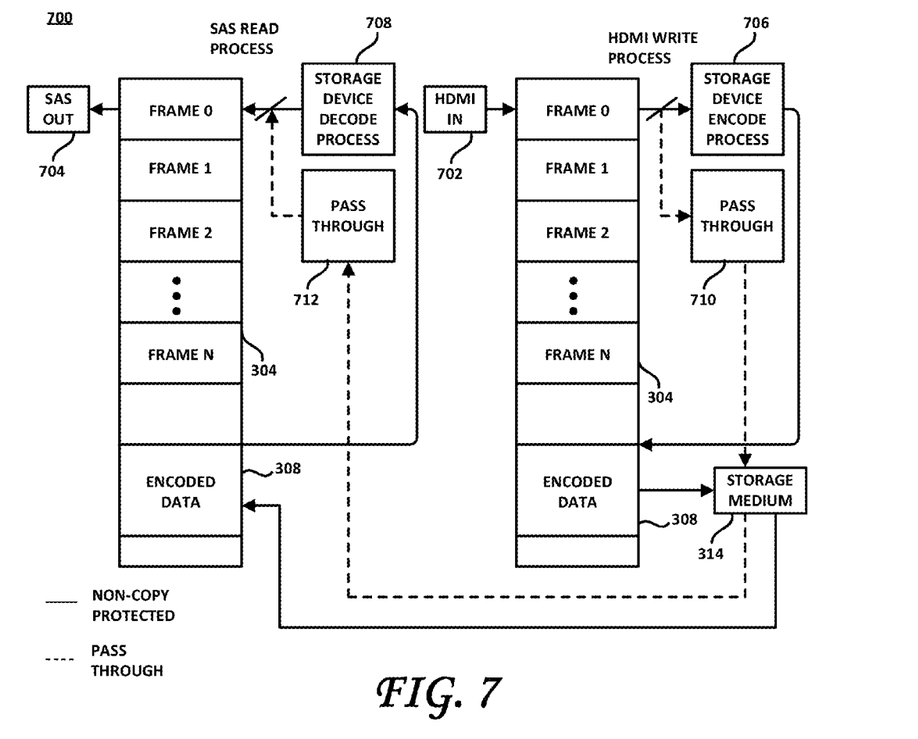
FIG. 7 is a block diagram of a non-linear mode of operation of a data storage device, according to one embodiment.

FIG. 7 is a block diagram of a non-linear mode of operation of a data storage device 700, according to one embodiment. According to one embodiment, the data storage device may be accessed in non-linear mode, in which input write data 702 may be received at HDMI Rx 272 of HDMI interface 267, whereas output read data 704 may be provided over a SATA/SAS/USB interface or other interface native to the data storage device 256. In the embodiment shown in FIG. 7, the output read data 704 is provided over a SAS interface. Although not shown in the Figures, it is to be understood that input write data may be received at, for example, an SATA/SAS/USB (for example) interface and output read data may be provided at an, for example, HDMI Tx 270 (or other high data rate interface). In FIG. 7 dashed lines show the path for pass through data and solid lines show the path for non-copy protected data. In the pass through case, input write data 702 may be presented at the HDMI Rx 272 of the data storage device, buffered in frame buffer 304 and shunted to pass through 710 before being stored in the storage medium 314, via, for example, a SAS or SATA interface. When the host issues a read command, the data storage device may retrieve the requested blocks from the storage medium 314, which are sent to pass through 712 into the frame buffer 304, bypassing the any decoding, for output at 704, either as a series of blocks or a stream of video frames. For the case in which the data is not copyrighted and not pass through, the input write data may be provided over, for example, an HDMI interface 702, buffered in frame buffer 304 and encoded in in encode process 706. The encoded write data is temporarily stored in frame buffer 304, as shown at 308, before being stored in storage medium 314 via, for example, the SAS or SATA data transfer protocol. When the host issues a read command, the encoded data may be read from the storage medium 314 and the retrieved encoded data buffered in frame buffer 304, as shown at 308. The encoded data at 308 may then be decoded at 708, buffered in frame buffer 304 before being provided at an SATA/SAS/USB (for example) interface, as shown at 704. The read data output may be a series of blocks or a stream of video frames. A ring buffer may be utilized to buffer a predetermined amount of, e.g., video data and provide DVR-like capabilities such as fast forward, pause, or rewind and the like. Advantageously, the data storage device may support block-based commands such as, for example, Set Config, Set Logical Block Address (LBA), Stream Read, Stream Write, Stream nBlocks, File open, File close, File read, File write, File seek, File remove and File move.

Full Duplex/Tape Streaming Mode

Figure 8:
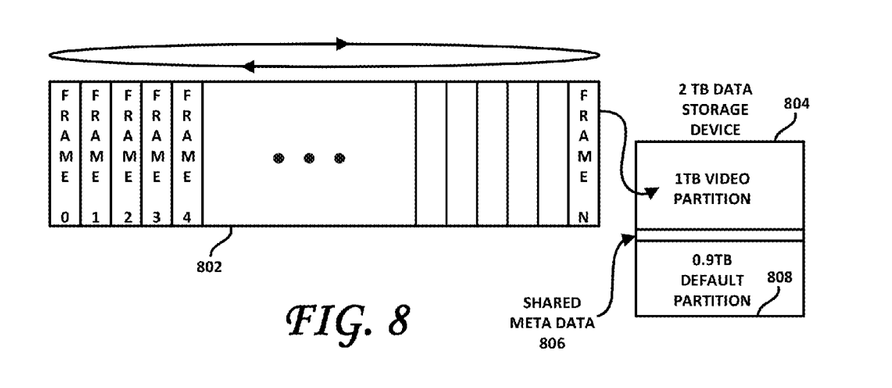
FIG. 8 is a diagram of an audio/video ring buffer and exemplary partitions of a data storage device according to one embodiment.

In the full duplex or tape streaming mode, video may be input to the data storage device from HDMI Rx 272 and video may be output as video frames from the data storage device from HDMI Tx 270. In this mode, a video partition 804 may be dynamically formed on, for example, the storage medium 314 and configured as a ring buffer, enabling the buffering of, for example, a predetermined amount of video storage, such as one hour. FIG. 8 is a diagram of an audio/video ring buffer 802 and exemplary partitions of a data storage device according to one embodiment. As shown, encoded/uncompressed frames (shown as frame 0, frame 1 . . . frame N) may be stored on the partition in a ring-buffer mechanism. According to one embodiment, once storage reaches to the maximum capacity (N frames, corresponding to a predetermined amount of video) of the ring buffer 802, previously-stored frames may be overwritten, oldest first. According to one embodiment, configuration of the partition 804 and handling of the stored data may be performed using a look-up table. According to one embodiment, at least the following host commands, received over, for example, a SCSI/SAS or SATA interface, may be supported: Available space in the partition, Content available on the partition [Dir], Locate partition, Start storage, Stop storage, Jump to a frame in the stored data (to support Trick Play, like FF, REW, etc.), Remove n frames, Move n frames, Insert n frames and File to LBA translation, to identify but a few possibilities. In this full duplex/tape streaming mode, a file system may be implemented that supports at least the following host commands: File open, File close, File read, File write, File seek, Defragment and Format, to name but a few possibilities.

FIG. 8 also shows one possible partition of an exemplary 2 TB data storage device, in which a 1 TB video partition may be dynamically created, as shown at 804, which leaves about 0.9 TB as a default partition for other data and a 0.1 TB partition for metadata. Other partitions are possible. While switching between modes, both the host and the data storage device 256 may require information about the available partitions, file system available, etc. This information, shown in FIG. 8 as shared meta data 806, may be updated and stored in the data storage device 256 during operation such that, when operating in different modes (tape streaming, non-linear or as a legacy data storage device, for example), both the host and the data storage device 256 may access the shared meta data 806 and utilize this data to access and update data on the data storage device 256.

Transcoding/Pass Through/Player Mode for Video Data

Figure 9:
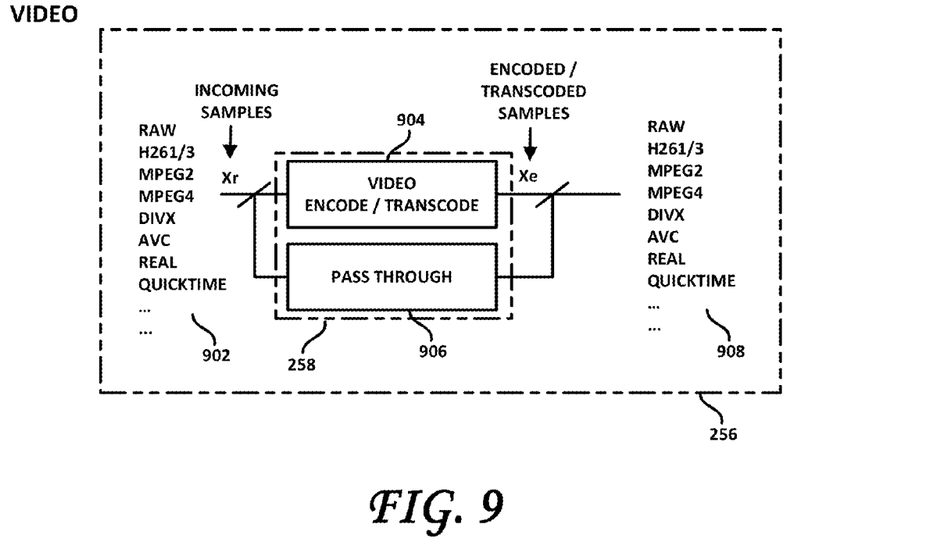
FIG. 9 is a diagram illustrating a video transcoding/pass-through/play the data storage device modes of a data storage device according to one embodiment.

FIG. 9 is a diagram illustrating a video transcoding/pass-through/player modes of a storage device according to one embodiment. According to one embodiment, the integration of a video codec 260 within the data storage device controller (or otherwise within the data storage device 256) enables the data storage device 256 to natively support any number of different video formats such as, for example, Raw, H261/3/4/5, MPEG2/4, DIVX, AVC, VC1, Real, Quicktime and FLASH and enable transcoding or pass through storage and playback capabilities. Other video formats may be supported. For example, video data received and encoded in MPEG4 format may be decoded and re-encoded in any supported video format before streaming to the host, over either of the first and second interfaces. For example, the video data may be stored in any of the supported video formats 902 and either transcoded to any other supported video format through video encode/transcode engine 904 or passed through unchanged, as shown at 906 as an output video stream or file 908.

Transcoding/Pass Through/Player Mode for Audio Data

Figure 10:
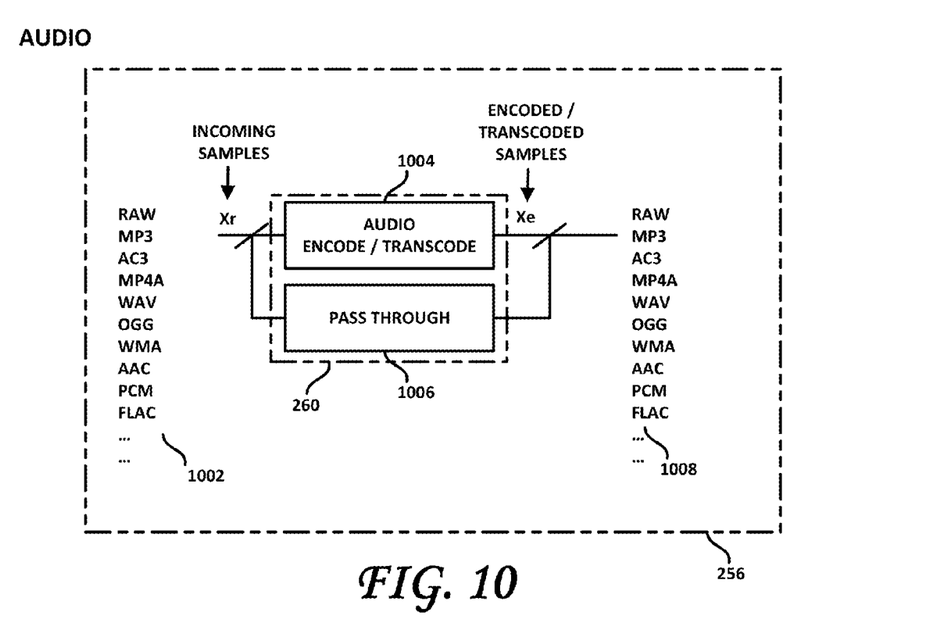
FIG. 10 is a diagram illustrating audio transcoding/pass-through/player modes of a data storage device according to one embodiment.

FIG. 10 is a diagram illustrating audio transcoding/pass-through/player modes of a storage device according to one embodiment. According to one embodiment, the integration of an audio codec 258 within the data storage device controller (or otherwise within the data storage device 256) enables the data storage device 256 to natively support any number of different audio encoding/compression (both lossy and lossless) formats such as, for example, Raw, MP3, AC3, MP4A, WAV, OGG, WMA, AAC, PCM and FLAC and enables transcoding or pass through storage and playback capabilities. Other audio formats may be supported. For example, audio data received and encoded in a lossless WAV format may be decoded and re-encoded in any supported video format such as MP3 before streaming to the host, over either of the first and second interfaces. For example, the audio data may be stored in any of the supported audio formats 1002 and either transcoded to any other supported audio format through audio encode/transcode engine 1004 or passed through unchanged, as shown at 1006 as an output audio stream or file 1008.

Figure 11:
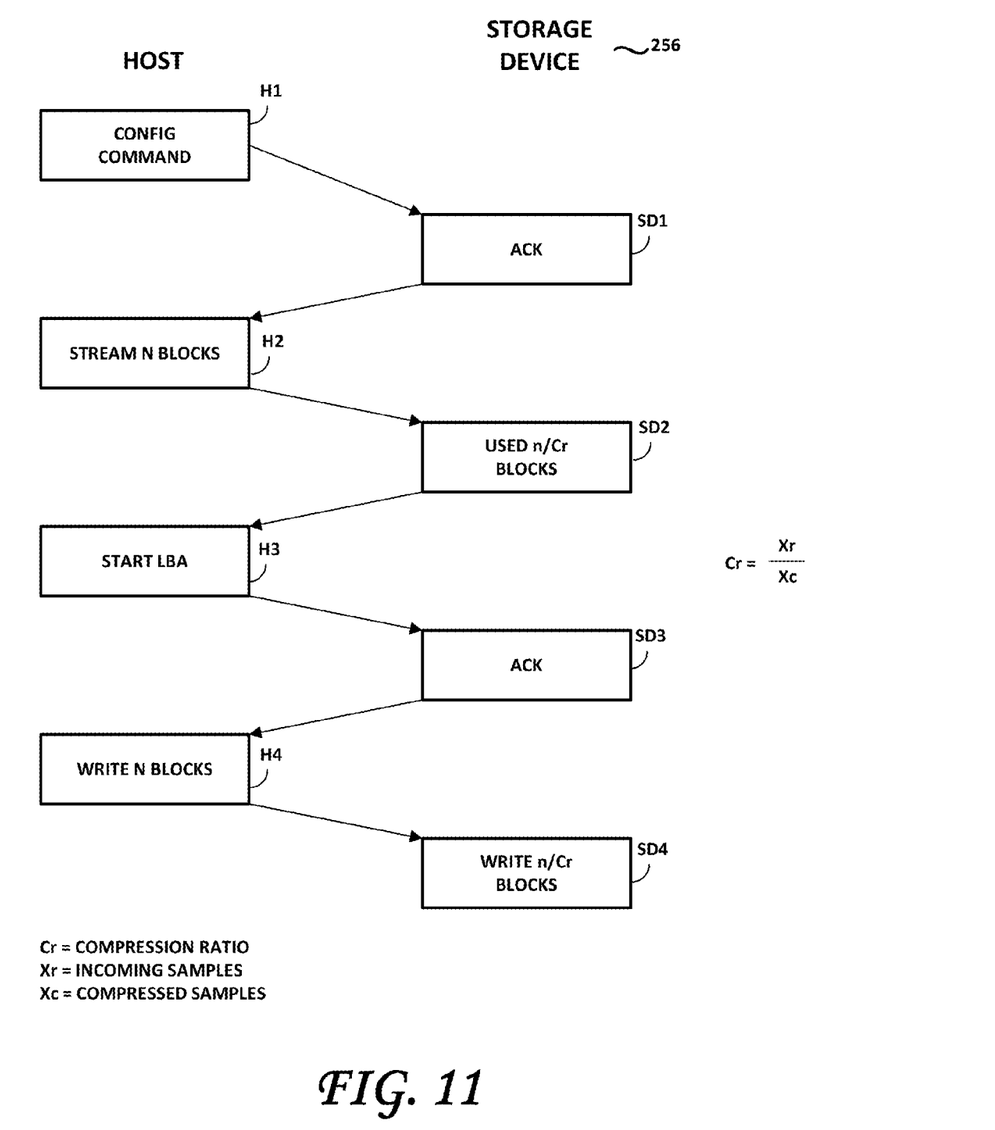
FIG. 11 shows communications between a host and a data storage device according to one embodiment.

FIG. 11 shows communications between a host and a storage device according to one embodiment, as the host issues commands for the data storage device 256 to write a plurality of blocks to be streamed by the host. As shown, the host may issue a Config Command at H1, which may include a number of parameters including, for example, the format (encoding and/or compression) to be used on the incoming data, as well as other parameters. The data storage device may acknowledge the Config Command at SD1. The data storage device 256 may then await the next command from the host. The next command, in this exemplary embodiment, is a write command, instructing the data storage device 256 to write N blocks of audio and/or video data streamed from the host, as shown at H2. For example, the host may direct the data storage device 256 to write N blocks of an audio uncompressed audio file to a specified file format at a specified degree of compression or fidelity. The data storage device 256 may then determine the required storage space to store the streamed N blocks in the specified format and/or compression or fidelity. To do so, the data storage device 256 may determine the compression ratio Cr as the ratio of the incoming samples Xr and the compressed samples Xc. For N blocks, therefore, the data storage device 256 may write N/Cr blocks to disk and/or to solid state storage. At H3, the host specifies the start LBA of the data, which is acknowledged at SD3 by the data storage device 256. At H4, the host sends the N blocks to be written to the data storage device 256 which, in turn, compresses the data and writes the aforementioned N/Cr blocks to disk and/or to solid state storage, as shown at SD4.

Figure 12:
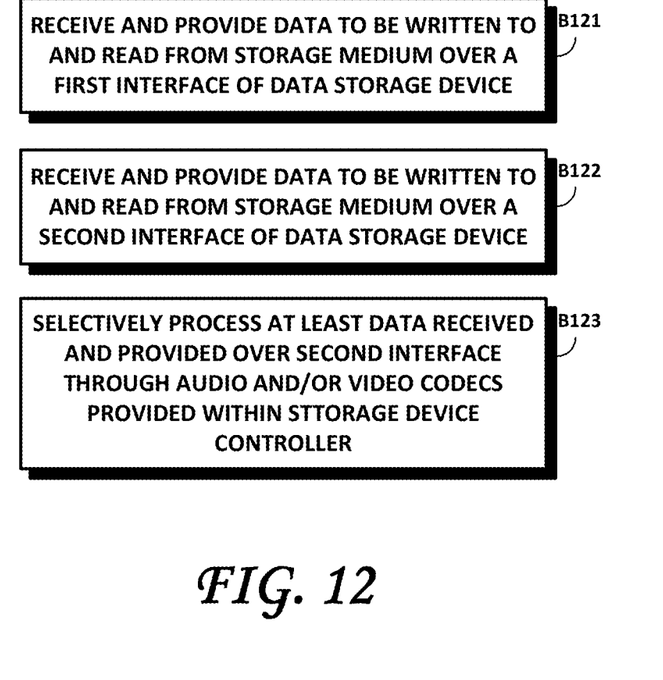
FIG. 12 is a flowchart of a method according to one embodiment.

FIG. 12 is a flowchart of a method according to one embodiment. As shown therein, block B121 calls for receiving and providing data to be written to and read from the storage medium over a first interface of the data storage device. This first interface may comprise, for example, a SAS/SATA interface. As show at block B122, the data storage device (or the controller thereof) may then receive and provide data to be written to and read from the storage medium over a second interface of the data storage device. Such second interface may, for example, comprise an HDMI interface or other high data rate interface. Block B123 calls for selectively processing at least data received and provided over the second interface through an audio codec and/or a video codec provided within the data storage device controller (or otherwise provided within data storage device 256).

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A data storage device, comprising:
   a storage medium;
   a first interface;
   a second interface; and
   a controller configured to read data from and write data to the storage medium, the controller comprising:
      an audio codec;
      a video codec; and
      a secure execution environment configured to preserve security of copy protected data written to and read from the storage medium, the secure execution environment comprising:
         a secure internal buffer configured to receive and store only copy protected data and to restrict access, from non-secure devices and processes and physical probes, to the stored copy protected data; and
         a secure encryption/decryption engine coupled to the secure internal buffer and configured to selectively and securely encrypt copy protected data stored in the secure internal buffer for storage on the storage medium and to securely decrypt encrypted copy protected data read from the storage medium that is to be provided to the secure internal buffer and from the secure internal buffer to at least one of the first and second interfaces, such that at least a data path for copy protected data between the secure internal buffer and the secure encryption/decryption engine and from the encryption/decryption engine to the storage medium is not shared with non copy protected data;
wherein the controller is further configured to:
receive data to be written to the storage medium over the first interface;
determine whether the data received over the first interface should be transcoded or passed through without transcoding;
responsive to the controller determining that the data received over the first interface should be passed through without transcoding, pass the data received over the first interface unchanged through to the storage medium for storage therein and provide the unchanged data from the storage medium to the second interface; and
responsive to the controller determining that the data received over the first interface should be transcoded, transcode, through at least one of the audio and video codecs, the data received over the first interface from a first format to a second format, store the transcoded data in the storage medium and provide the stored transcoded stored data to the second interface.

2. The data storage device of claim 1, wherein the storage medium comprises at least one of a rotating disk and solid state storage.

3. The data storage device of claim 1, wherein the controller is further configured to transcode by selectively encoding, decoding, encrypting, decrypting, compressing and decompressing the data received over the first interface.

4. The data storage device of claim 1, wherein the first interface comprises at least one of a SCSI, SAS, SATA, USB, PCI, PCIe, SOP, FC, Ethernet, Thunderbolt and UART interface and wherein the second interface comprises at least one of a digital interface and an analog interface.

5. The data storage device of claim 4, wherein the digital interface comprises one of an HDMI, DVI, LDVS, Thunderbolt and IEEE 1394 (Firewire) interface and wherein the analog interface comprises one of an SVGA, Component, Composite and S-Video interface.

6. The data storage device of claim 1, wherein the controller is further configured to:
receive data to be written to the storage medium over the second interface; and
provide data read from the storage medium to the first interface.

7. The data storage device of claim 1, wherein the controller is further configured to:
establish a ring buffer of a predetermined capacity in the storage medium;
sequentially write data to the ring buffer up to the predetermined capacity; and
thereafter sequentially overwrite previously written data in the ring buffer beyond the predetermined capacity.

8. The data storage device of claim 1, wherein the controller is further configured to, responsive to block-based commands received from a host, write blocks streamed from the host over one of the first and second interfaces to the storage medium.

9. The data storage device of claim 1, wherein the controller comprises hardware configured to implement at least one of the audio codec and the video codec.

10. The data storage device of claim 1, wherein at least one of the audio codec and the video codec is at least partially implemented in firmware.

11. The data storage device of claim 1, wherein at least one of the audio codec and the video codec is at least partially implemented in programmable firmware that is programmed before blocks are streamed from a host.

12. The data storage device of claim 1, wherein the controller is further configured to selectively:
compress data received over the first interface prior to writing the received data to the storage medium;
decompress the compressed data written to the storage medium; and
provide the decompressed data to one of the first and second interfaces.

13. The data storage device of claim 1, wherein the controller is further configured to selectively:
encrypt data received over the first interface prior to writing the received data to the storage medium;
decrypt the encrypted data written to the storage medium; and
provide the decrypted data to one of the first and second interfaces.

14. A controller for a data storage device, the controller being configured to write data to and read data from a storage medium, the controller comprising:
an audio codec;
a video codec; and
a secure execution environment configured to preserve security of copy protected data written to and read from the storage medium, the secure execution environment comprising:
a secure internal buffer configured to receive and store only copy protected data and to restrict access, from non-secure devices and processes and physical probes, to the stored copy protected data; and
a secure encryption/decryption engine coupled to the secure internal buffer and configured to selectively and securely encrypt copy protected data stored in the secure internal buffer for storage on the storage medium and to securely decrypt encrypted copy protected data read from the storage medium that is to be provided to the secure internal buffer and from the secure internal buffer to at least one of the first and second interfaces, such that at least a data path for copy protected data between the secure internal buffer and the secure encryption/decryption engine and from the encryption/decryption engine to the storage medium is not shared with non copy protected data;
wherein the controller is further configured to:
receive data to be written to the storage medium over the first interface;
determine whether the data received over the first interface should be transcoded or passed through without transcoding;
responsive to the controller determining that the data received over the first interface should be passed through without transcoding, pass the data received over the first interface unchanged through to the storage medium for storage therein and provide the unchanged data from the storage medium to the second interface; and
responsive to the controller determining that the data received over the first interface should be transcoded, transcode, through at least one of the audio and video codecs, the data received over the first interface from a first format to a second format, store the transcoded data in the storage medium and provide the stored transcoded stored data to the second interface.

15. A method of controlling a data storage device comprising a storage medium using a storage device controller, the method comprising:

receiving data to be written to the storage medium over a first interface of the data storage device;

determining whether the data received over the first interface should be transcoded or passed through without transcoding;

passing the data received over the first interface unchanged through to the storage medium for storage therein and providing the unchanged data from the storage medium to a second interface when the controller determines that data received over the first interface should not be transcoded;

transcoding, through at least one of an audio codec and a video codec, the data received over the first interface from a first format to a second format, storing the transcoded data in the storage medium, and providing the stored transcoded stored data to the second interface when the controller determines that data received over the first interface should be transcoded; and preserving a security of copy protected data written to and read from the storage medium by:

storing copy protected data in a secure internal buffer configured to receive and store only copy protected data therein and to restrict access, from non-secure devices and processes and physical probes, to the stored copy protected data; and selectively and securely encrypting copy protected data stored in the secure internal buffer in a secure encryption/decryption engine coupled to the secure internal buffer;

storing the encrypted copy protected data on the storage medium; and securely decrypting encrypted copy protected data read from the storage medium that is to be provided to the secure internal buffer and from the secure internal buffer to at least one of the first and second interfaces, such that at least a data path for copy protected data between the secure internal buffer and the secure encryption/decryption engine and from the encryption/decryption engine to the storage medium is not shared with non copy protected data.

16. The method of claim 15, wherein the storage medium comprises at least one of a rotating disk and solid state storage.

17. The method of claim 15, wherein transcoding comprises selectively encoding, decoding, encrypting, decrypting, compressing and decompressing the data received over the first interface.

18. The method of claim 15, wherein the first interface comprises at least one of a SCSI, SAS, SATA, USB, PCI, PCIe, SOP, FC, Ethernet, Thunderbold and UART interface and wherein the second interface comprises at least one of a digital interface and an analog interface.

19. The method of claim 18, wherein the digital interface comprises one of an HDMI, DVI, LDVS, Thunderbolt and IEEE 1394 (Firewire) interface and wherein the analog interface comprises one of an SVGA, Component, Composite and S-Video interface.

20. The method of claim 15, further comprising:

receiving data to be written to the storage medium over the second interface; and providing data read from the storage medium over the first interface.

21. The method of claim 15, further comprising:

establishing a ring buffer of a predetermined capacity in the storage medium; and sequentially writing data to the ring buffer up to the predetermined capacity and thereafter sequentially overwriting previously written data in the ring buffer beyond the predetermined capacity.

22. The method of claim 15, further comprising, responsive to block-based commands received from the host, writing blocks streamed from a host over one of the first and second interfaces to the storage medium.

23. The method of claim 15, wherein the controller comprises hardware configured to implement at least one of the audio codec and the video codec.

24. The method of claim 15, wherein at least one of the audio codec and the video codec is at least partially implemented in firmware.

25. The method of claim 15, wherein at least one of the audio codec and the video codec is at least partially implemented in programmable firmware and wherein the method further comprises programming the programmable firmware before blocks are streamed from a host.

26. The method of claim 15, further comprising:

compressing data received over the first interface prior to writing the received data to the storage medium;

decompressing the compressed data written to the storage medium; and providing the decompressed data to one of the first and the second interface.

27. The method of claim 15, further comprising selectively:

encrypting data received over the first interface prior to writing the received data to the storage medium;

decrypting the encrypted data written to the storage medium; and providing the decrypted data to one of the first and the second interface.

* * * * *